United States Patent
Chen et al.

(10) Patent No.: US 7,901,091 B2
(45) Date of Patent: Mar. 8, 2011

(54) PROJECTION APPARATUS

(75) Inventors: Che-Hsueh Chen, Hsinchu (TW);
Jung-Chi Chen, Hsinchu (TW);
Chih-Hao Wu, Hsinchu (TW)

(73) Assignee: Coretronic Corporation, Hsinchu (TW)

( * ) Notice: Subject to any disclaimer, the term of this patent is extended or adjusted under 35 U.S.C. 154(b) by 629 days.

(21) Appl. No.: 11/938,794

(22) Filed: Nov. 13, 2007

(65) Prior Publication Data

US 2008/0225243 A1    Sep. 18, 2008

(30) Foreign Application Priority Data

Mar. 15, 2007    (TW) ................................ 96108924 A

(51) Int. Cl.
*G03B 21/14*    (2006.01)

(52) U.S. Cl. ............. 353/119; 353/69; 353/70; 248/393; 248/397; 248/157; 248/423; 248/188.2; 248/188.4; 248/188.8; 248/126; 248/127; 248/135; 248/173; 248/405

(58) Field of Classification Search ............. 353/69, 353/70, 119; 248/393, 397, 157, 423, 188.2, 248/188.4, 188.8, 126, 127, 129, 135, 136, 248/173, 405, 688, 689, 690, 691, 692, 693
See application file for complete search history.

(56) References Cited

U.S. PATENT DOCUMENTS

| 3,968,949 | A  | * | 7/1976  | Romano, Jr. ............ 248/650 |
| 6,302,543 | B1 | * | 10/2001 | Arai et al. ................ 353/70 |
| 6,461,002 | B1 |   | 10/2002 | Su |
| 6,604,831 | B1 | * | 8/2003  | Prestigomo et al. ..... 353/119 |
| 7,111,948 | B2 | * | 9/2006  | Lee et al. ................ 353/119 |
| 7,270,306 | B2 | * | 9/2007  | Chen ..................... 248/188.2 |
| 7,494,229 | B2 | * | 2/2009  | Miyasaka ................. 353/101 |
| 7,686,263 | B2 | * | 3/2010  | Inoue ..................... 248/188.2 |
| 2006/0169854 | A1 | * | 8/2006  | Chen ..................... 248/188.2 |
| 2007/0258055 | A1 | * | 11/2007 | Shao et al. ................ 353/70 |

FOREIGN PATENT DOCUMENTS

| JP | 2002-295111 | 10/2002 |
| TW | I232344 | 5/2005 |
| TW | I312439 | 7/2009 |

OTHER PUBLICATIONS

"Notice of Allowance of Taiwan counterpart application", issued on Oct. 29, 2009, p. 1-p. 4.

* cited by examiner

*Primary Examiner* — Georgia Y Epps
*Assistant Examiner* — Sultan Chowdhury
(74) *Attorney, Agent, or Firm* — Jianq Chyun IP Office

(57) ABSTRACT

A projection apparatus including a projection body and at least one adjusting leg is provided. The projection body has a casing, and the bottom of the casing has at least one accommodating cave. The adjusting leg includes a supporter and a pivoting rod. The supporter has a supporting portion and a screw connected to the supporting portion, and the projection body is capable of being supported on a surface by the supporting portion. The pivoting rod is pivoted to the casing and has a threaded hole, and the screw is screwed into the threaded hole. The pivoting rod is capable of being rotated along an axis of the pivoting rod to drive the supporter to rotate, so as to accommodate the supporting portion in the accommodating cave.

22 Claims, 9 Drawing Sheets

PROJECTION APPARATUS

CROSS-REFERENCE TO RELATED APPLICATION

This application claims the priority benefit of Taiwan application serial no. 96108924, filed on Mar. 15, 2007. All disclosure of the Taiwan application is incorporated herein by reference.

BACKGROUND OF THE INVENTION

1. Field of the Invention

The present invention generally relates to a projection apparatus, and particularly, to a projection apparatus that adjusts the position of projected image.

2. Description of Related Art

With the development of science and technology, various projection apparatuses have been widely used in various situations, such as briefings, lectures, theaters, audio-visual teaching, interactive teaching, family theatre sets and the like. In order to meet the requirements of users, the profile design of a projection apparatus will trend to be more beautiful and small, and adjustment of the projection angle of the projection apparatus may be implemented by configuring an adjusting leg.

Referring to FIGS. 1A and 1B, a projection apparatus 100 includes a casing 110, a projection lens 120, two lifting legs 130 and an adjusting leg 140. The casing 110 comprises a leading end 112, a back end 114 and a bottom 116, and the projection lens 120 is assembled on the leading end 112 of the casing 110. The two lifting legs 130, for example, are respectively configured on the two sides of the bottom 116 of the casing 110 near the leading end 112, and the adjusting leg 140, for example, is configured on the middle position of the bottom 116 of the casing 110 near the back end 114. Referring to FIG. 1C, when using the projection apparatus 100, users may change the top angle (α) of the projection lens 120 and the tilting angle (β) of the projection apparatus 100 by respectively adjusting the two lifting legs 130, so as to change the position of the image projected by the projection apparatus.

However, the lifting legs 130 of the projection apparatus 100 are generally made of screws or racks, and the lifting leg 130 made of screws generally comprises comparatively small screw pitch so as to have the function of fine tuning, thus more time is consumed for adjusting the projection angles (the top angle α and the tilting angle β) of the projection apparatus 100. Furthermore, the lifting leg 130 made of racks generally comprises comparatively large screw pitch so as to have the function of coarse tuning, thus the lifting leg 130 is not adjusted to a preferred position when the projection angles (the top angle α and the tilting angle β) of the projection apparatus 100 is adjusted.

In order to resolve the problems mentioned above, an adjusting leg having both screws and racks is provided in the U.S. Pat. No. 6,302,543B1 allowing the lifting leg of the projection apparatus to have the functions of coarse tuning and fine tuning. Referring to FIG. 2, the lifting leg 210 of the projection apparatus 200 includes a first adjusting apparatus 212 and a second adjusting apparatus 214. In the conventional technique, the first adjusting apparatus 212 is comprised of racks to have the function of coarse tuning, and the second adjusting apparatus 214 is comprised of screws and connected to the first adjusting apparatus 212 so as to have the function of fine tuning However, the lifting leg 210 of the projection apparatus 200 as shown in FIG. 2 simultaneously comprises the functions of coarse tuning and fine tuning, the structure thereof is comparatively complex, and the fabrication cost is higher. Furthermore, when users pack the projection apparatus 200, the lifting leg 210 is generally accommodated in the casing 220, thus the height of the lifting leg 210 need to be readjusted during each use of the projection apparatus 200, and the operation is comparatively inconvenient.

SUMMARY OF THE INVENTION

Accordingly, the present invention is directed to a projection apparatus comprising an adjusting leg having both coarse tuning and fine tuning functions, and may decrease fabricated cost effectively.

The present invention is directed to a projection apparatus comprising an adjusting leg that is capable of being accommodated in the accommodating cave of the casing when users pack the projection apparatus, and the adjusting leg need not to be readjusted during each use of the projection apparatus.

A projection apparatus including a projection body and at least one adjusting leg is provided. The projection body comprises a casing, and a bottom of the casing comprises at least one accommodating cave. The adjusting leg includes a supporter and a pivoting rod. The supporter comprises a supporting portion and a screw connected to the supporting portion. The projection body is capable of being supported on a surface by the supporting portion. The pivoting rod is pivoted to the casing and comprises a threaded hole, and the screw is screwed into the threaded hole. The pivoting rod is capable of being rotated along an axis of the pivoting rod to drive the supporter to rotate so as to accommodate the supporting portion in the accommodating cave.

In the present invention, the projection angle of the projection body is adjustable by adjusting the screw and rotating the pivoting rod. Thus the adjusting leg may have the functions of both coarse tuning and fine tuning. Furthermore, there is no need to adjust the screw when the supporting portion of the adjusting leg is accommodated in the accommodating cave, so that when the projection apparatus is put in the same position again for use, the adjusting leg need not to be readjusted.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1A:
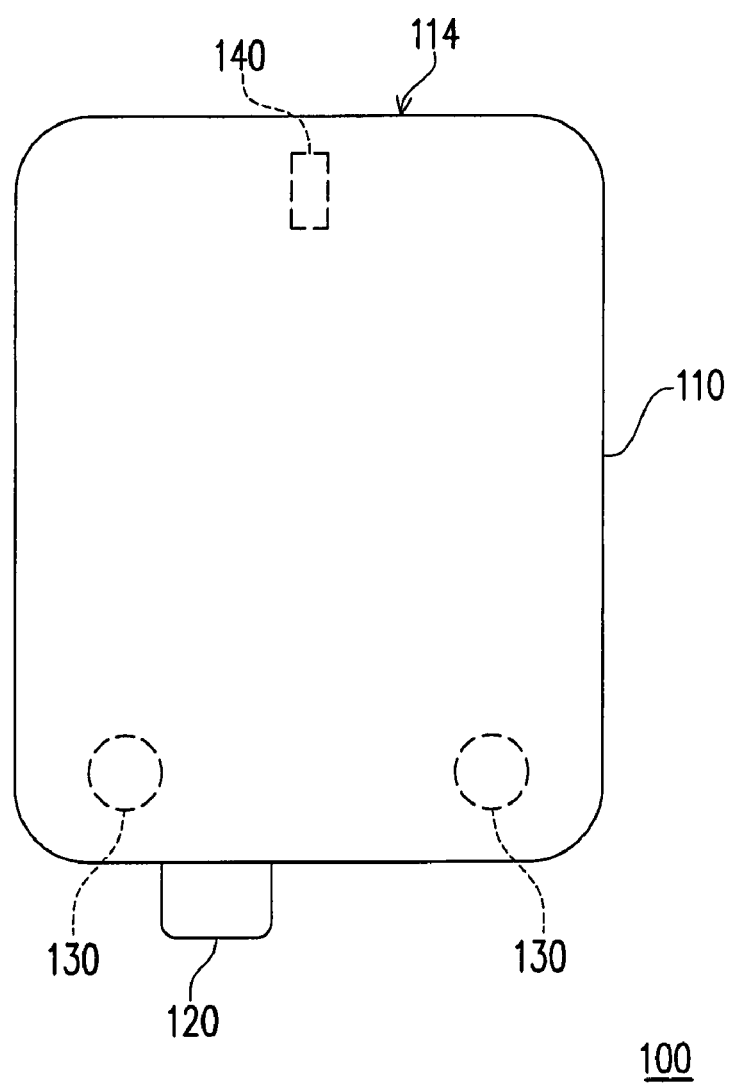
FIG. 1A is a top view of a conventional projection apparatus.
Figure 1B:
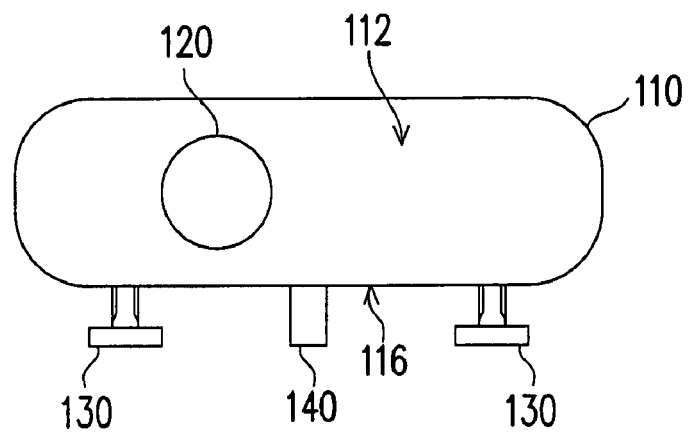
FIG. 1B is an elevation view of the FIG. 1A.
Figure 1C:
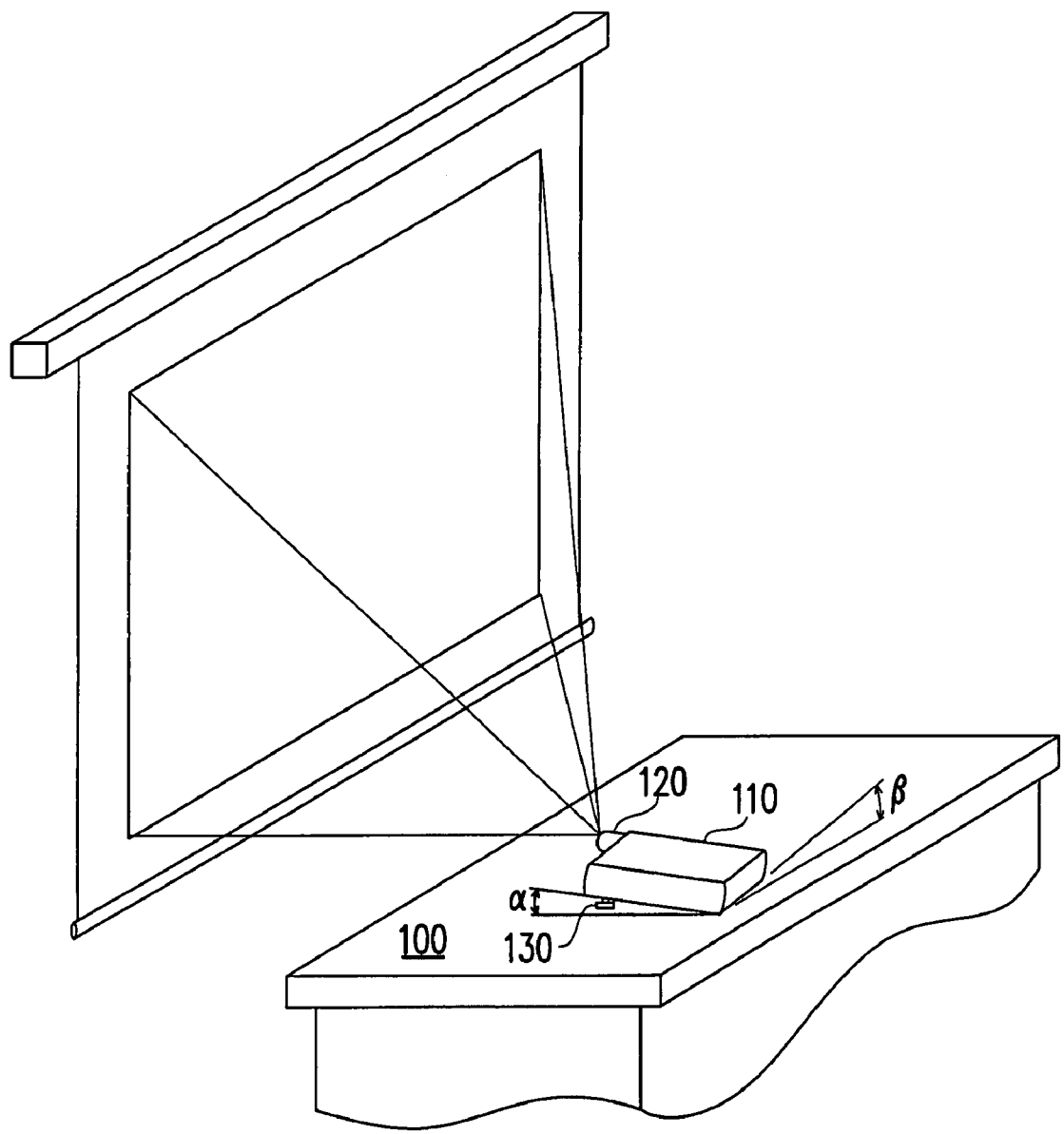
FIG. 1C is a schematic view illustrating while the conventional projection apparatus projects an image on a screen.
Figure 2:
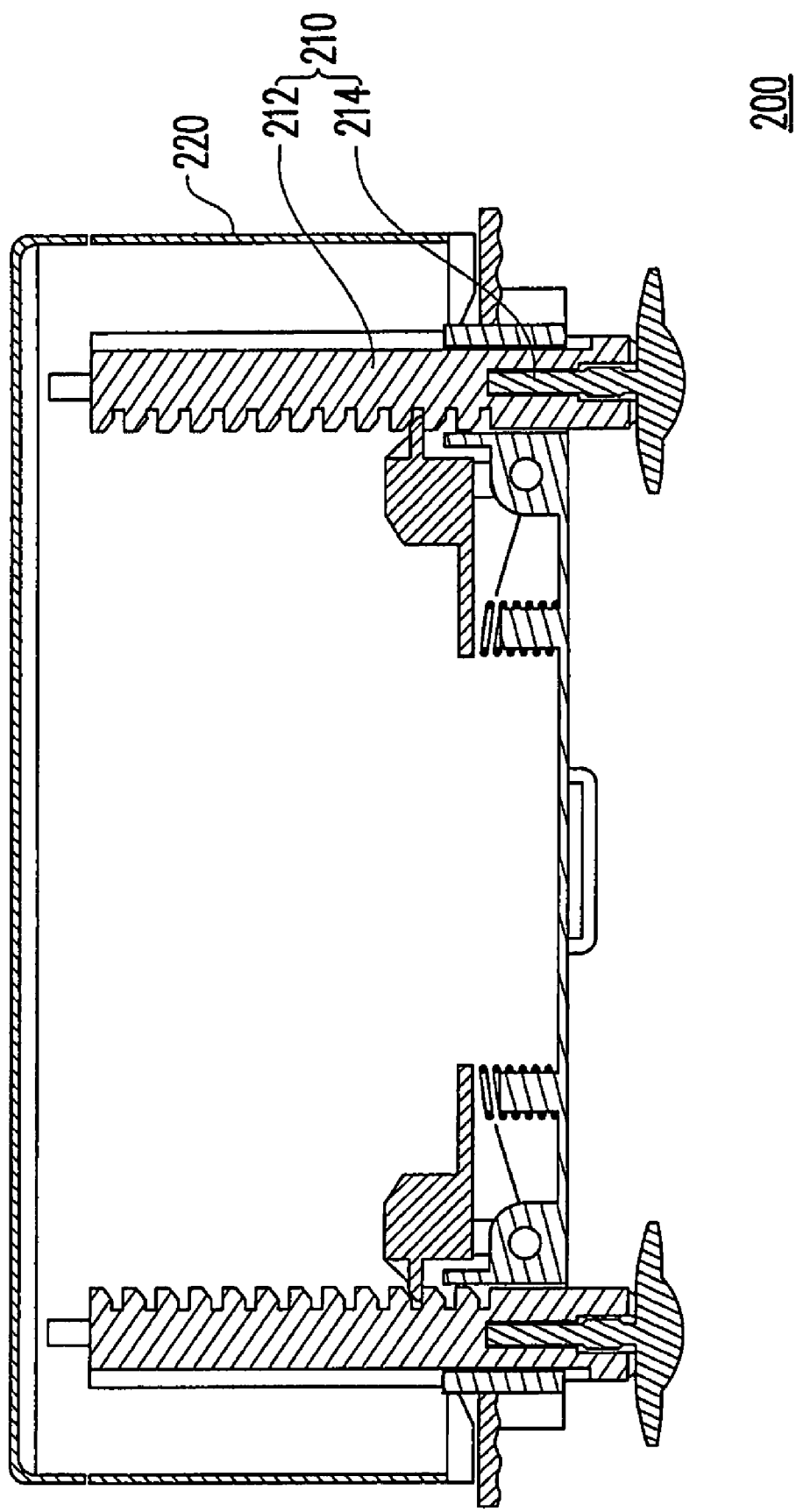
FIG. 2 is a schematic view illustrating a structure of another conventional projection apparatus.

Reference will now be made in detail to the present preferred embodiments of the invention, examples of which are illustrated in the accompanying drawings. Wherever possible, the same reference numbers are used in the drawings and the description to refer to the same or like parts.

In the following detailed description of the preferred embodiments, reference is made to the accompanying drawings which form a part hereof, and in which is shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component facing "B" component directly or one or more additional components is between "A" component and "B" component. Also, the description of "A" component "adjacent to" "B" component herein may contain the situations that "A" component is directly "adjacent to" "B" component or one or more additional components is between "A" component and "B" component. Accordingly, the drawings and descriptions will be regarded as illustrative in nature and not as restrictive.

First Embodiment

Referring to FIGS. 3A to 3D, the projection apparatus 300a includes a projection body 310 and at least one adjusting leg 320. The projection body 310 comprises a casing 312, and a bottom 312a of the casing 312 comprises at least one accommodating cave 3122. In order to simplify the drawings, the members of the projection apparatus 300a such as the optical engine configured in the casing 312, other optical elements and the like are omitted in the sectional views of the FIGS. 3C and 3D. The adjusting leg 320 includes a supporter 322 and a pivoting rod 324. The supporter 322 comprises a supporting portion 3222 and a screw 3224 connected to the supporting portion 3222, and the projection body 310 is capable of being supported on a surface 400 by the supporting portion 3222. The pivoting rod 324 is pivoted to the casing 312 and comprises a threaded hole 3242, and the screw 3224 is screwed into the threaded hole 3242. The pivoting rod 324 may be rotated along an axis 324a of the pivoting rod 324 to drive the supporter 322 to rotate, so as to accommodate the supporting portion 3222 in the accommodating cave 3122.

In the present embodiment, the casing 312, for example, comprises a leading end 312b and a back end 312c, and the projection body 310 comprises a projection lens 314 assembled on the leading end 312b. The projection body 310 is capable of projecting an image by the projection lens 314. Furthermore, the accommodating cave 3122 is, for example, adjacent to the leading end 312b of the casing 312.

Figure 3A:
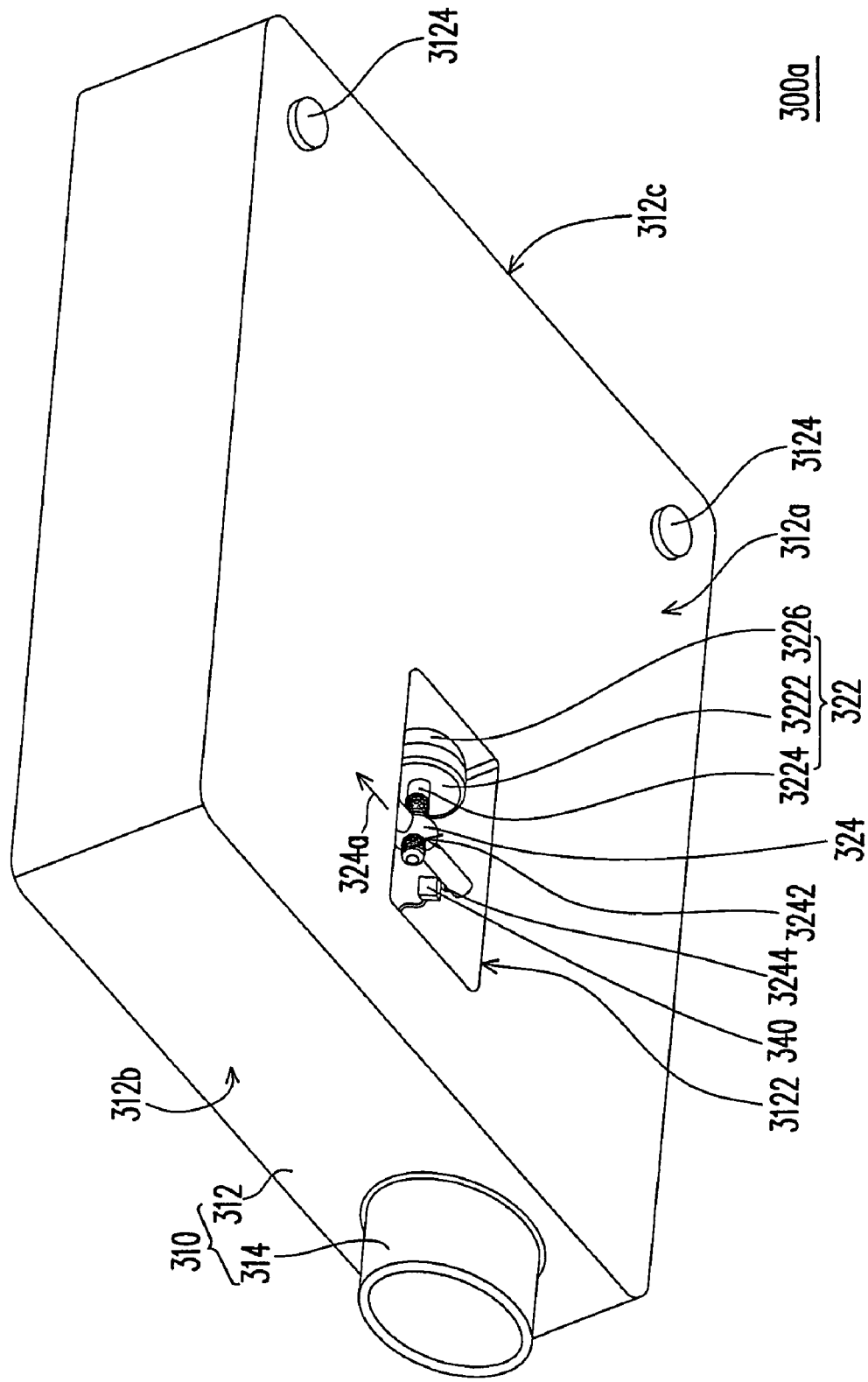
FIG. 3A is a schematic view of a projection apparatus according to a first embodiment of the present invention.
Figure 3B:
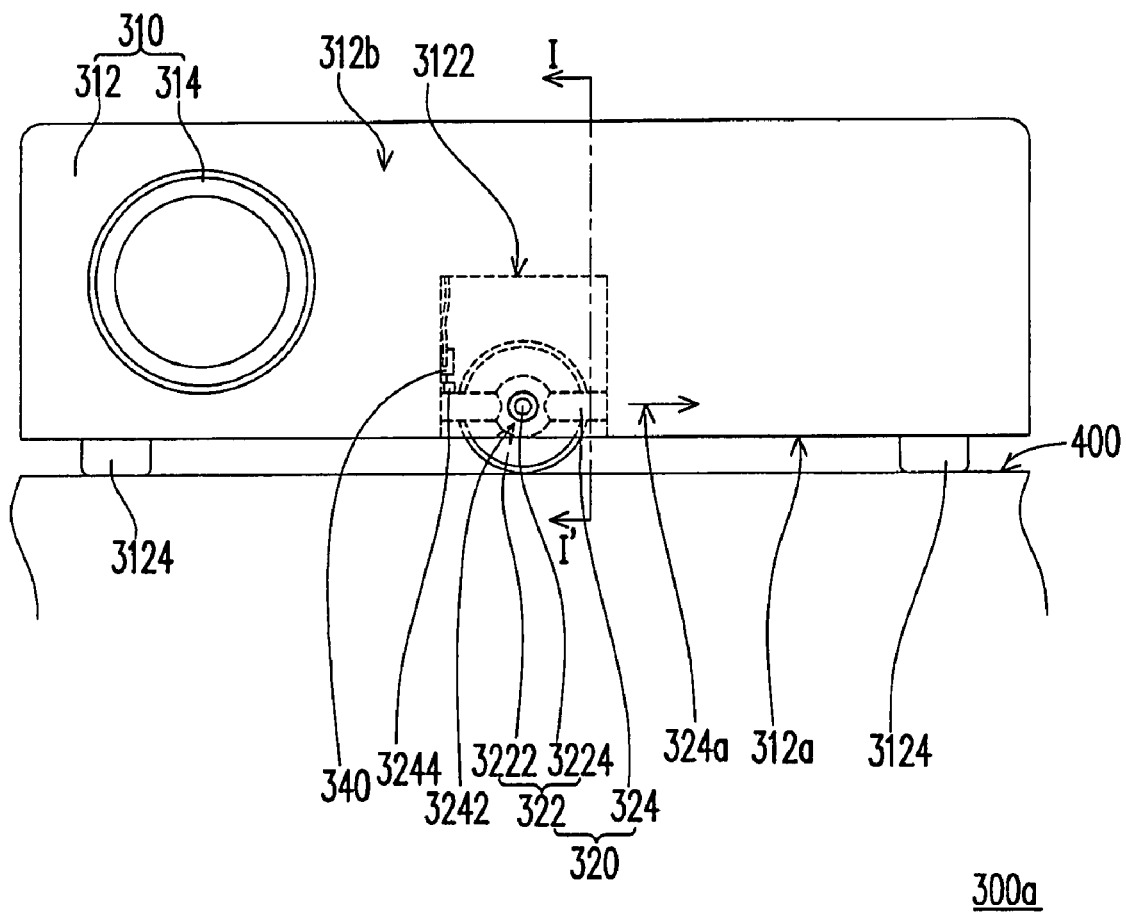
FIG. 3B is a front view of FIG. 3A.
Figure 3C:
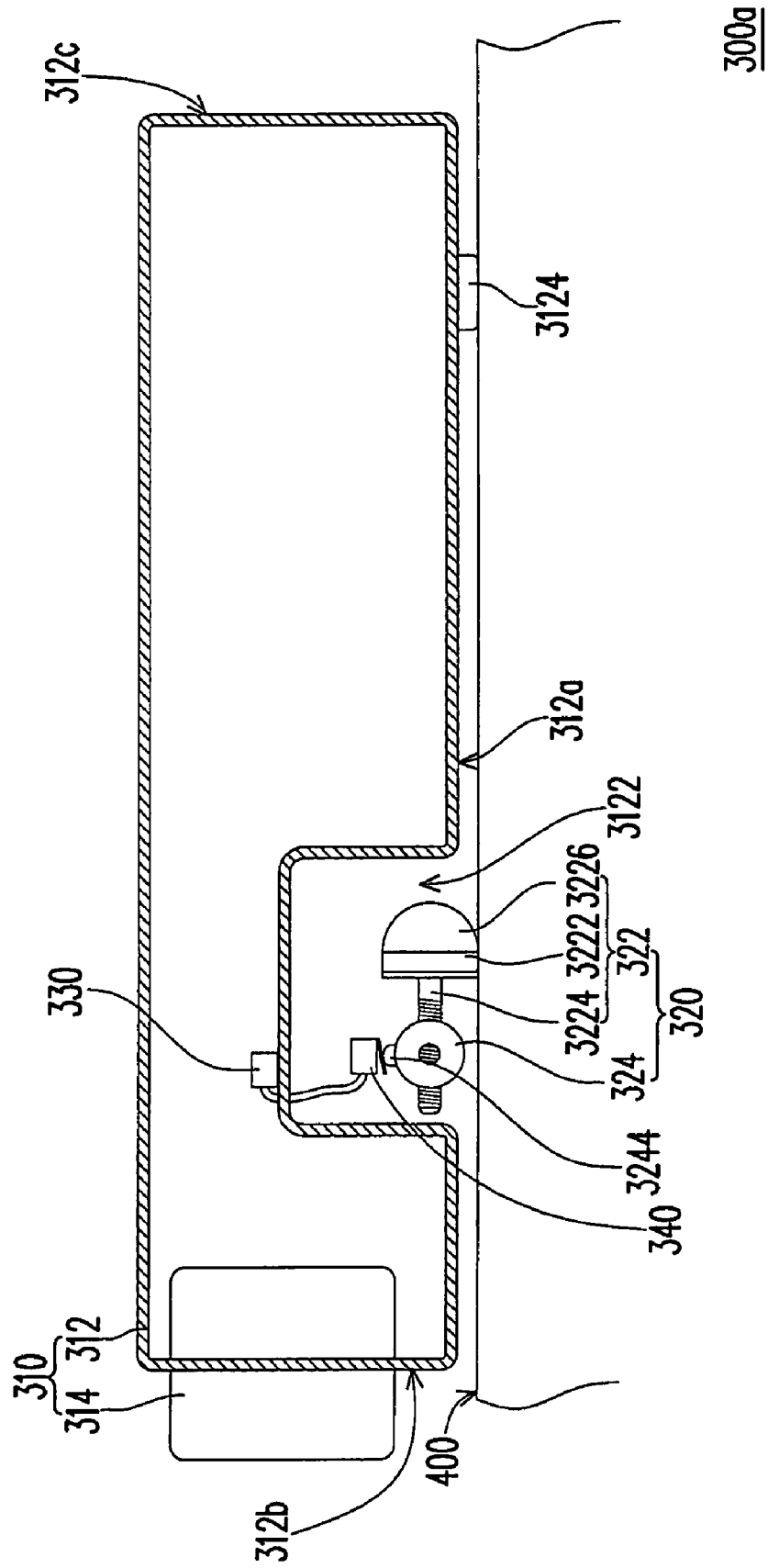
FIG. 3C is a sectional view along I-I' in FIG. 3B.
Figure 3D:
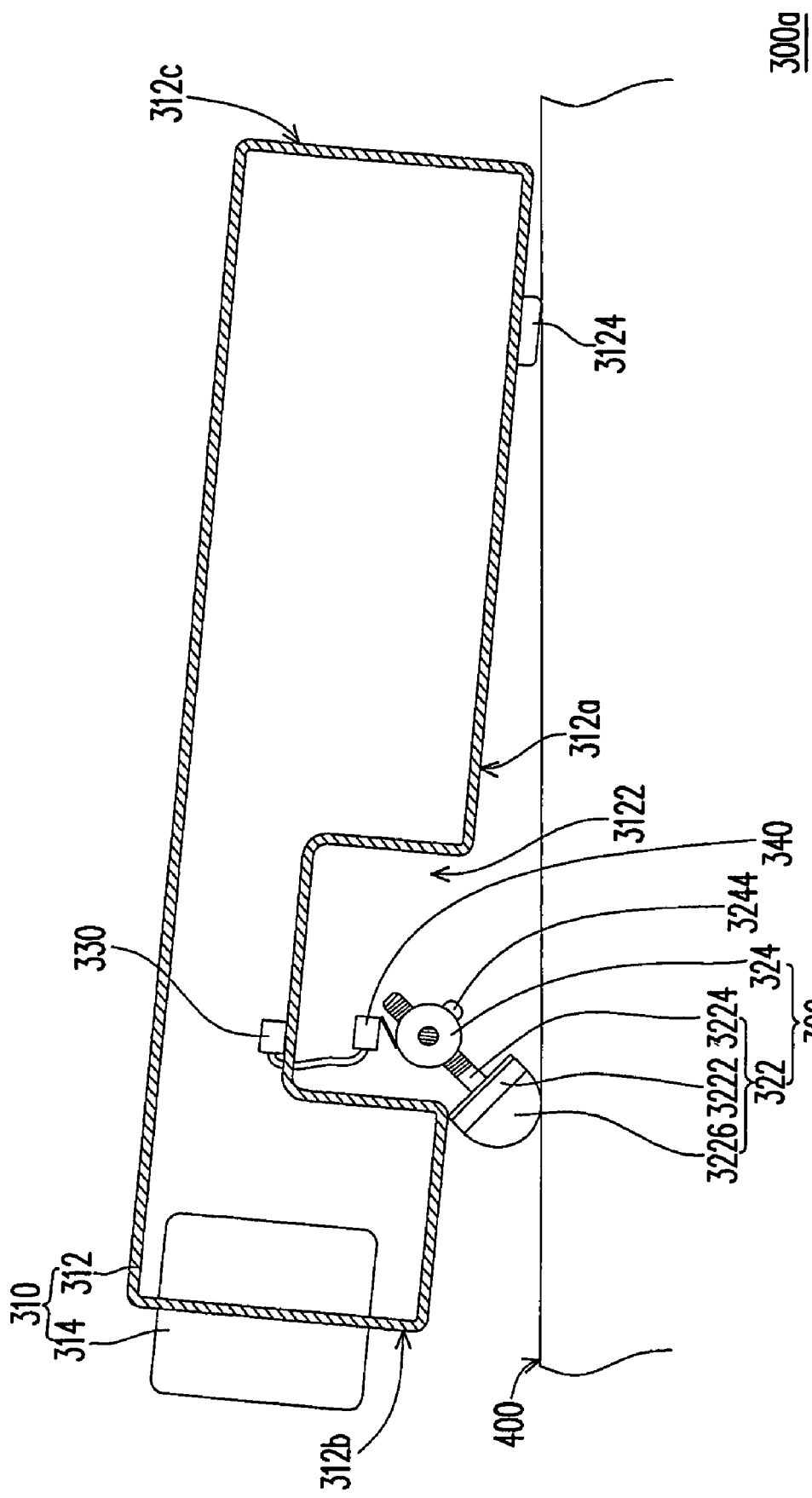
FIG. 3D is a schematic view illustrating while the supporting portion is moved out of the accommodating cave in FIG. 3C.

The pivoting rod 324 may be rotated along the axis 324a of the pivoting rod 324 to drive the supporter 322 to rotate. Thus, as shown in FIG. 3D, users may rotate the supporter 322 along the axis 324a of the pivoting rod 324 to move the supporting portion 3222 out of the accommodating cave 3122, so as to rapidly increase the projection angle of the projection body 310 (coarse tuning). Furthermore, the screw 3224 is screwed into the threaded hole 3242. Thus, when the supporting portion 3222 is moved out of the accommodating cave 3122, users may increase or decrease the projection angle of the projection body 310 by rotating the supporting portion 3222 or the screw 3224 (fine tuning).

Besides, after the use of the projection apparatus 300a, users may accommodate the supporting portion 3222 in the accommodating cave 3122 by merely rotating the supporter 322 along the axis 324a of the pivoting rod 324. Furthermore, since users need not to adjust the supporting portion 3222 or the screw 3224 when housing the adjusting leg 320, the adjusting leg 320 need not to be readjusted when users put the projection apparatus 300a in the same position again during the subsequent use.

Furthermore, the profile of the supporting portion 3222 in the embodiment is, for example, a round body, and an axis of the supporting portion 3222, for example, overlaps an axis of the screw 3224. However, the above embodiment is not intended to limit the scope of the present invention. For example, the supporting portion 3222 may be comprised of cams such that when the supporting portion 3222 is accommodated in the accommodating cave 3122, users may increase or decrease the projection angle of the projection body 310 by rotating the supporting portion 3222 or the screw 3224 (fine tuning). Or, the axis of the supporting portion 3222 may also be configured off the axis of the screw 3224, such that when rotating the supporting portion 3222 to different angles, the projection body 310 has different projection angles (fine tuning). The supporting portion 3222 may be sphere, hemisphere, cylinder or other prismatic body such as ellipse, which are all round body.

The casing 312 may comprise, for example, two rubber pads 3124. The rubber pads 3124 are respectively, for example, adjacent to two sides of the back end 312c of the casing 312 so that the projection body 310 is supported on the surface 400 by the rubber pads 3124 and the supporting portion 3222.

However, the above embodiment is not intended to limit the scope of the present invention as such. For example, the accommodating cave 3122 may be adjacent to the back end 312c of the casing 312, and the rubber pads 3124 may be respectively adjacent to the two sides of the leading end 312b of the casing 312. Furthermore, the number of the accommodating cave 3122 and the adjusting leg 320 is not limited to only one, and the number of the rubber pads 3124 is not limited to only two, they may be respectively one or more than two. For example, the numbers of the accommodating cave 3122 and the adjusting leg 320 may be two, and they are respectively, for example, adjacent to the two sides of the leading end 312b (or the back end 312c) of the casing 312, wherein the adjusting legs 320 are respectively corresponding to the two accommodating caves 3122.

Besides, the projection apparatus 300a may further comprise an image adjustment unit 330 configured in the projection body 310. The image adjustment unit 330 comprises, for example, a correction unit for adjusting an image in a trapezoid shape projected by the projection body 310 via the projection lens 314 to an image in a rectangle shape.

Generally, when the projection body 310 projects an image on a screen via the projection lens 314, a picture on the screen is preferable rectangular in shape. However, after users adjust the adjusting leg 320 of the projection apparatus 300a to increase the projection angle of the projection body 310, the distance between the projection lens 314 and the upper limb and the lower limb of the picture will be different compared with the value before adjustment thereof (for example, larger or smaller). Thus, the widths of the upper limb and the lower limb of the picture are different, so that the picture is in a trapezoidal shape. At this time, users may adjust the shape of the picture to a rectangular shape by using the image adjustment unit 330 (trapezoid correction unit).

In the present embodiment, when the supporting portion 3222 is accommodated in the accommodating cave 3122, the image adjustment unit 330 is, for example, shut off, and when the supporting portion 3222 is moved out of the accommodating cave 3122, the image adjustment unit 330 is turned on to adjust the picture to a rectangular shape.

In detail, the projection apparatus 300a in the present embodiment may further comprise a switch 340 (shown in FIGS. 3C and 3D), and the pivoting rod 324 may comprise a lug 3244. The switch 340 is, for example, configured in the accommodating cave 3122 and electrically connected to the image adjustment unit 330. When the supporting portion 3222 is accommodated in the accommodating cave 3122, the lug 3244 pushes the switch 340 to shut off the image adjustment unit 330. However, when the supporting portion 3222 is moved out of the accommodating cave 3122, the lug 3244 releases the switch 340 to turn on the image adjustment unit 330 to adjust the shape of the projected image to a rectangular shape.

Furthermore, the adjusting leg 320 may further comprise an elastic element 3226 connected to the supporting portion 3222. The supporting portion 3222 is, for example, connected between the screw 3224 and the elastic element 3226, and the supporting portion 3222 is, for example, supported on the surface 400 by the elastic element 3226. In the embodiment, the elastic element 3226 comprises, for example, a rubber leg and the profile thereof may be a hemisphere, a prismatic or cam.

Second Embodiment

Figure 4A:
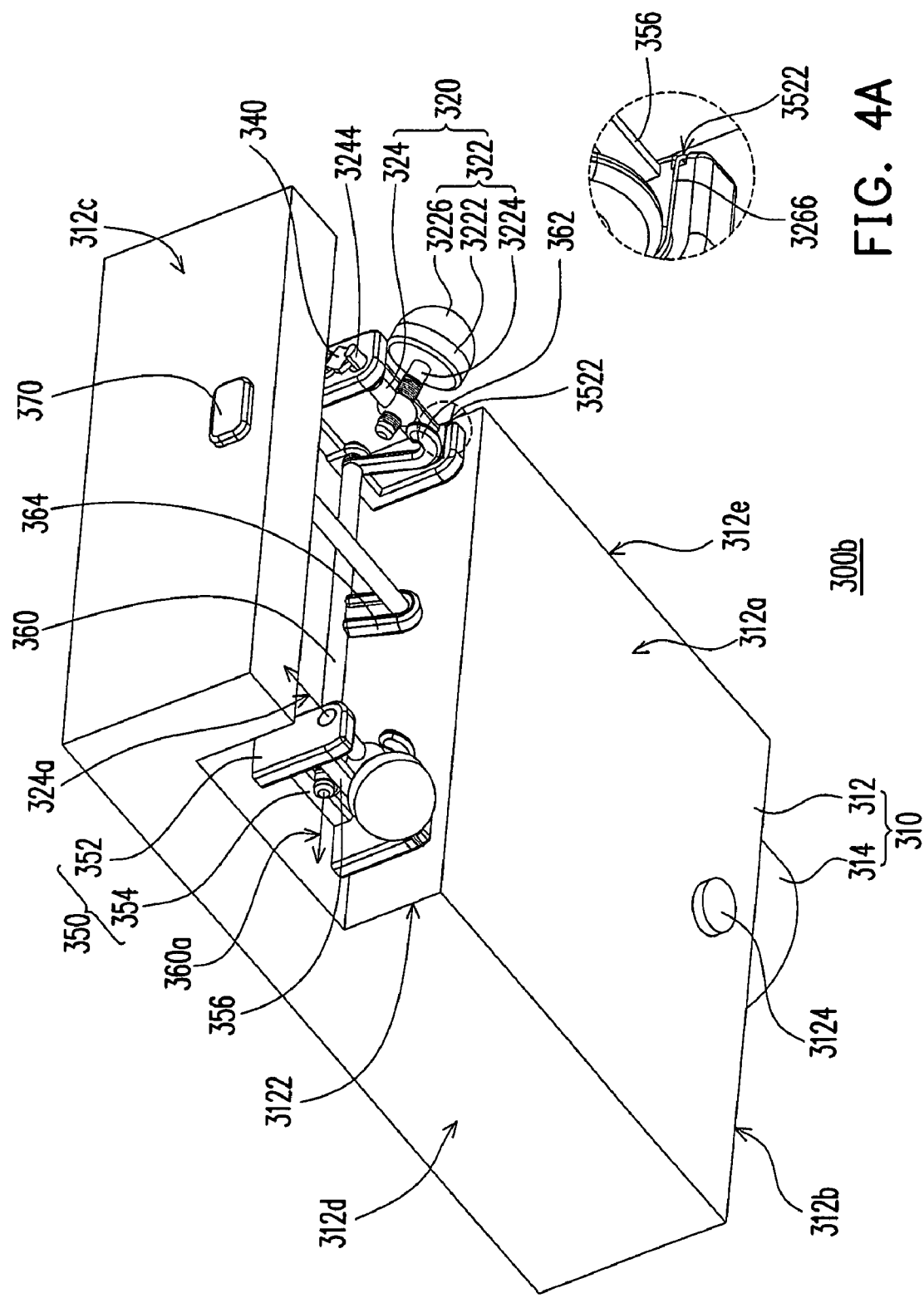
FIGS. 4A and 4B are schematic views of a projection apparatus according to a second embodiment of the present invention.
Figure 4B:
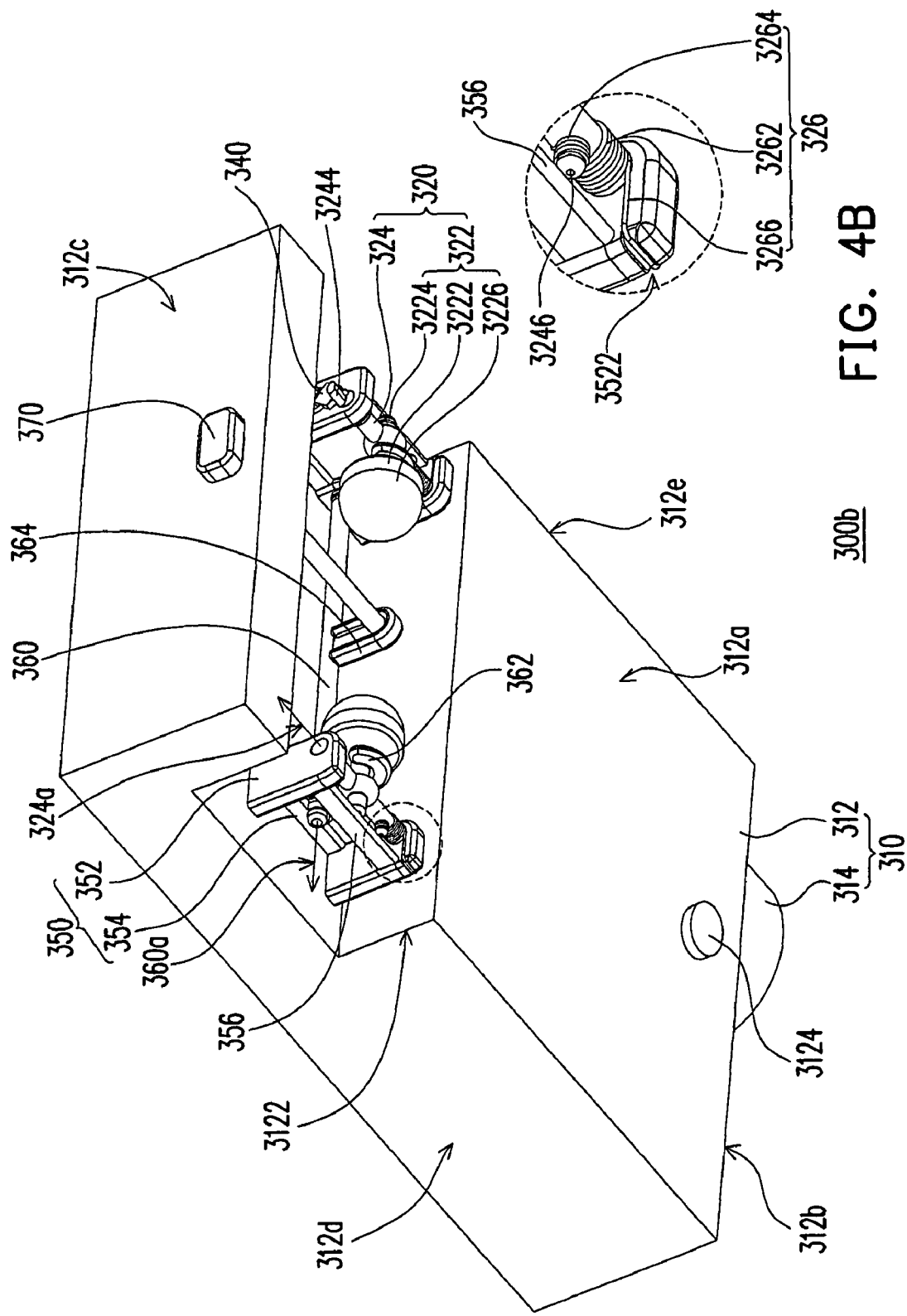

Referring to FIGS. 4A and 4B, in the present embodiment, the accommodating cave 3122 extends from the left side 312d to the right side 312e of the casing 312, and is adjacent to the back end 312c of the casing 312. Furthermore, the projection apparatus 300b comprises two adjusting legs 320 configured in the accommodating cave 3122. In each of the adjusting legs 320, the pivoting rod 324 is capable of driving the supporter 322 to rotate to accommodate the supporter portion 3222 in the accommodating cave 3122. Furthermore, the casing 312 may also include a rubber pad 3124 adjacent to the leading end 312b of the casing 312, and each of the adjusting leg 320 may also include an elastic element 3226 connected to the supporting portion 3222 so that the projection body 310 is supported on the surface 400 by the rubber pad 3124 and the elastic elements 3226. In the present embodiment, the shapes of the supporting portion 3222 and the elastic elements 3226 are same or similar as those of the first embodiment, thus the detailed description thereof is omitted.

Besides, the lug 3244 of the pivoting rod 324 is, for example, disposed on one of the pivoting rods 324, and the image adjustment unit 330 is, for example, disposed in the accommodating cave 3122. The operating method that the lug 3244 of the pivoting rod 324 pushes (or releases) the switch 340 to shut off (or turn on) the image adjustment unit 330 is identical to that of the first embodiment, thus the detailed description thereof is omitted.

In the present embodiment, the projection apparatus 300b further comprises two frames 350 respectively corresponding to one of the adjusting legs 320. The frames 350 are configured in the accommodating cave 3122, and connected to the casing 312. In each of the adjusting legs 320, the pivoting rod 324 is, for example, pivoted to the casing 312 by one of the frames 350. Each of the frame 350 includes two side walls 352 and a rib 354 connected between the side walls 352, and the pivoting rod 324 is, for example, pivoted between the two side walls 352 of one of the frames 350 so that the supporter 322 is able to be rotated along the axis 324a of the pivoting rod 324. Thus the supporting portions 3222 may be moved out of the accommodating cave 3122 (as shown in FIG. 4A) or may be accommodated in the accommodating cave 3122 (as shown in FIG. 4B), such that the projection body 310 may include different projection angles.

Furthermore, the projection apparatus 300b comprises a connecting rod 360. The connecting rod 360 comprises two hooks 362 respectively disposed adjacent to the two ends of the connecting rod 360, and the two ends of the connecting rod 360 are respectively pivoted to the ribs 354 of the frames 350. When the supporting portions 3222 of the supporter 322 are accommodated in the accommodating cave 3122, the screws 3224 of the supporters 322 may be configured in the hooks 362 to fix the supporters 322 in the accommodating cave 3122 (as shown in FIG. 4B).

Besides, each of the adjusting legs 320 may further comprise a spring 326 configured to the pivoting rod 324 (as shown in FIG. 4B). In each of the adjusting legs 320, when the screw 3224 is disengaged from the hook 362, the spring 326 is capable of driving the supporter 322 to rotate to move the supporting portion 3222 out of the accommodating cave 3122 (as shown in FIG. 4A). In the present embodiment, each of the frames 350 may further have a limiting portion 356 connected between the two side walls 352. In each of the adjusting legs 320, the limiting portion 356 may limit the maximum rotating angle when the pivoting rod 324 drives the supporter 322 to rotate.

In detail in each of the adjusting legs 320, referring to FIG. 4B, the spring 326 of the embodiment comprises, for example, a spring body 3262, a first connecting portion 3264 connected to one end of the spring body 3262 and a second connecting portion 3266 connected to the other end of the spring body 3262. Furthermore, the pivoting rod 324 comprises, for example, a block 3246, and one of these side walls 352 of each of the frames 350 comprises, for example, a slit 3522. The spring body 3262 is, for example, mounted on the pivoting rod 324, and the first connecting portion 3264 is, for example, mounted on the block 3246, and the second connecting portion 3266 is, for example, engaged in the slit 3522. At the same time, the two ends of the spring 326 (the first connecting portion 3264 and the second connecting portion 3266) are respectively fixed to the block 3246 and the slit 3522.

In each of the adjusting legs, when the supporter 322 is rotated along the axis 324a of the pivoting rod 324 to configure the screw 3224 in the hook 362, so as to fix the supporter 322 in the accommodating cave 3122 (as shown in FIG. 4B), the spring 326 may be elastically distorted. At the same time, the screw 3224 is far from the limiting portion 356. When the screw 3224 of the supporter 322 is disengaged from the hook 362, the spring 326 rotates the pivoting rod 324 along the axis 324a of the pivoting rod 324 to drive the supporter 322 to rotate, so as to move the supporting portion 3222 out of the accommodating cave 3122 (as shown in FIG. 4A). Next, the supporter 322 rotates along the axis 324a of the pivoting rod 324 until the screw 3224 of the supporter 322 leans on the limiting portion 356. Thus, the limiting portion 356 may be used to limit the maximum rotating angle when the supporter 322 is rotated. The spring 326 comprises, for example, torsional spring.

Furthermore, the projection apparatus 300b may further comprise a key 370 configured on the casing 312, and the connecting rod 360 comprise a rocker arm 364 disposed between the hooks 362. When the supporters 322 are fixed in the accommodating cave 3122 (as shown in FIG. 4B), the screws 3224 of the supporters 322 may be disengaged from the hooks 362 by pushing the key 370 (as shown in FIG. 4A). In detail, when the key 370 is pushed, the key pushes the rocker arm 364 to rotate the connecting rod 360 along an axis 360a of the connecting rod 360 to drive the hooks 362 to rotate along the axis 360a of the connecting rod 360, so as to disengage the screws 3224 of the supporters 322 from the hooks 362. At the same time, if the adjusting legs 320 comprises the springs 326, the springs 326 drive the pivoting rods 324 to rotate along the axes 324a of the pivoting rods to drive the supporters 322 to rotate, so as to move the supporting portions 3222 out of the accommodating cave 3122 (as shown in FIG. 4A).

However, the present invention is not limited to the above embodiments as such. For example, when the amount of the adjusting leg 320 is one (referring to the first embodiment), the projection apparatus 300b may also comprise a frame 350 configured in the accommodating cave 3122 and connected to the casing 312. And, the pivoting rod 324 of the adjusting leg 320 is, for example, pivoted to the casing 312 by the frame 350. The structure of the frame 350 is the same as that of the second embodiment, thus the detailed description thereof is omitted. Furthermore, in other embodiments, the accommodating cave 3122 of the projection apparatus 300b is adjacent to the leading end 312b of the casing 312, thus the adjusting leg 320 is disposed adjacent to the leading end 312b of the casing 312.

In summary, the projection apparatus of the present invention comprises at least one of the following advantages:

1. The adjusting leg of the projection apparatus comprises both coarse tuning and fine tuning functions.

2. The adjusting leg of the projection apparatus may be accommodated in the accommodating cave of the casing, and the operation for accommodating the adjusting leg is comparatively simple and rapid.

3. The adjusting leg of the projection apparatus need not to be readjusted in the same position again during the subsequent use.

4. The structure of the adjusting leg of the projection apparatus of the present invention is simple compared with the conventional projection apparatus.

The foregoing description of the preferred embodiment of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like is not necessary limited the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A projection apparatus, comprising:
 a projection body, having a casing, wherein a bottom of the casing comprises at least one accommodating cave;
 at least one adjusting leg, comprising:
  a supporter, having a supporting portion and a screw connected to the supporting portion, wherein the projection body is capable of being supported on a surface by the supporting portion; and
  a pivoting rod, pivoted to the casing, having a threaded hole, wherein the screw is screwed into the threaded hole, and the pivoting rod is capable of being rotated along an axis of the pivoting rod to drive the supporter to rotate so as to accommodate the supporting portion in the accommodating cave; and
 a connecting rod, comprising at least one hook, wherein when the supporting portion is accommodated in the accommodating cave, the screw is disposed in the corresponding hook.

2. The projection apparatus according to claim 1, wherein the casing comprises a leading end and a back end, the projection body further comprises a projection lens assembled on the leading end, and the projection body is capable of projecting an image by the projection lens.

3. The projection apparatus according to claim 2, wherein the accommodating cave is adjacent to the leading end.

4. The projection apparatus according to claim 2, wherein the accommodating cave is adjacent to the back end.

5. The projection apparatus according to claim 2, wherein number of the at least one adjusting leg is two, the accommodating cave extends from a left side of the casing to a right side of the casing, and in each of the adjusting legs, the pivoting rod drives the supporter to rotate, so as to accommodate the supporting portion in the accommodating cave.

6. The projection apparatus according to claim 5, further comprising two frames respectively corresponding to the adjusting legs, wherein the frames are configured in the accommodating cave and connected to the casing, and in each of the adjusting legs, the pivoting rod is pivoted to the casing by one of the frames.

7. The projection apparatus according to claim 6, wherein each of the frames comprises two side walls and a rib connected between the two side walls, and in each of the adjusting legs, the pivoting rod is pivoted between the two side walls of one of the frames.

8. The projection apparatus according to claim 7, wherein two ends of the connecting rod are respectively pivoted to the ribs, when the connecting rod comprises two hooks, the two hooks are respectively adjacent to the two ends of the connecting rod, and in each of the adjusting legs, when the supporting portion is accommodated in the accommodating cave, the screw is disposed in the one of the hooks.

9. The projection apparatus according to claim 8, further comprising a key configured on the casing, wherein the connecting rod comprises a rocker arm disposed between the two hooks, and the key is capable of pushing the rocker arm to make the connecting rod to rotate along the axis of the connecting rod to drive the two hooks to rotate along the axis of the connecting rod, so that in each of the adjusting legs, the screw is disengaged from one of the hooks.

10. The projection apparatus according to claim 9, wherein each of the adjusting legs further comprises a spring configured to the pivoting rod, and in each of the adjusting legs, when the screw is disengaged from one of the hooks, the spring is capable of driving the supporter to rotate, so as to move the supporting portion out of the accommodating cave.

11. The projection apparatus according to claim 10, wherein each of the springs comprises a spring body, a first connecting portion connected to one end of the spring body, and a second connecting portion connected to the other end of the spring body, each of the pivoting rod comprises a block, and one of the two side walls of each of the frames comprises a slit, and in each of the adjusting legs, the spring body is mounted on the pivoting rod, the first connecting portion is mounted on the block, and the second connecting portion is engaged in the slit.

12. The projection apparatus according to claim 11, wherein each of the springs comprises a torsional spring.

13. The projection apparatus according to claim 7, wherein each of the frames further comprises a limiting portion connected between the two side walls thereof, and in each of the adjusting legs, after the supporting portion is moved out of the accommodating cave, the screw leans on the limiting portion to restrict a maximum rotating angle when the pivoting rod drives the supporter to rotate.

14. The projection apparatus according to claim 2, wherein numbers of the at least one accommodating cave and the at least one adjusting leg are two, the two accommodating caves are respectively corresponding to the two adjusting legs and adjacent to the leading end.

15. The projection apparatus according to claim 2, wherein numbers of the at least one accommodating cave and the at least one adjusting leg are two, the two accommodating caves are respectively corresponding to the two adjusting legs and adjacent to the back end.

16. The projection apparatus according to claim 1, further comprising an image adjustment unit configured in the projection body, wherein when the supporting portion is accommodated in the accommodating cave, the image adjustment unit is shut off, and when the supporting portion is moved out of the accommodating cave, the image adjustment unit is turned on.

17. The projection apparatus according to claim 16, wherein the pivoting rod comprises a lug, and the projection apparatus comprises a switch configured in the accommodating cave and electrically connected to the image adjustment unit, when the supporting portion is accommodated in the accommodating cave, the lug pushes the switch to shut off the image adjustment unit, and when the supporting portion is moved out of the accommodating cave, the lug releases the switch to turn on the image adjustment unit.

18. The projection apparatus according to claim 1, wherein a profile of the supporting portion comprises a round body.

19. The projection apparatus according to claim 18, wherein an axis of the screw is off an axis of the supporting portion.

20. The projection apparatus according to claim 1, wherein the supporting portion includes a cam.

21. The projection apparatus according to claim 1, wherein the adjusting leg further comprises an elastic element connected to the supporting portion and the supporting portion is supported on the surface by the elastic element.

22. The projection apparatus according to claim 21, wherein the elastic element comprises a rubber leg.

* * * * *